United States Patent
Borsos et al.

(10) Patent No.: US 10,901,066 B2
(45) Date of Patent: Jan. 26, 2021

(54) TECHNIQUE FOR ULTRA-WIDE BAND POSITIONING

(71) Applicant: Telefonaktiebolaget LM Ericsson (publ), Stockholm (SE)

(72) Inventors: Tamas Borsos, Budapest (HU); Péter Hága, Budapest (HU); Zsófia Kallus, Budapest (HU); Zsolt Kenesi, Budapest (HU); Mate Szebenyei, Maglod (HU); Peter Vaderna, Budapest (HU); András Veres, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/755,910

(22) PCT Filed: Nov. 13, 2017

(86) PCT No.: PCT/EP2017/079059
§ 371 (c)(1),
(2) Date: Apr. 14, 2020

(87) PCT Pub. No.: WO2019/091583
PCT Pub. Date: May 16, 2019

(65) Prior Publication Data
US 2020/0319289 A1   Oct. 8, 2020

(51) Int. Cl.
*H04W 4/02*   (2018.01)
*H04W 64/00*   (2009.01)
(Continued)

(52) U.S. Cl.
CPC .............. *G01S 5/0284* (2013.01); *G01S 5/06* (2013.01)

(58) Field of Classification Search
CPC ............ G01S 5/04; G01S 5/0242; G01S 5/06; G06Q 10/087; H04W 4/02; H04W 64/00
(Continued)

(56) References Cited

U.S. PATENT DOCUMENTS

| 6,784,827 B2* | 8/2004 | Hirt | ........................... G01S 5/02 |
| | | | 342/42 |
| 7,660,590 B2* | 2/2010 | Timiri | ................... H04W 64/00 |
| | | | 455/456.3 |

(Continued)

FOREIGN PATENT DOCUMENTS

| ES | 2601138 | * | 2/2017 |
| KR | 20170060588 A | * | 7/2017 |
| WO | 2017051062 A1 | | 3/2017 |

OTHER PUBLICATIONS

"Tag, You're It: Ranging and Finding via RFID Technology" A. Costanzo • D. Masotti • T. Ussnnueller • R. Weigel, IEEE Microwave Magazine (vol. 14, Issue: 5, pp. 36-46) Jul. 2013 (Year: 2013).*

(Continued)

Primary Examiner — William D Cumming
(74) Attorney, Agent, or Firm — Coats + Bennett, PLLC

(57) ABSTRACT

A mobile tag for an ultra-wide band (UWB) positioning system, and related devices. The UWB positioning system includes mobile tags, stationary anchors, and a central positioning entity. The mobile tag is a first mobile tag configured to acquire positioning information that depends on a relative position between the first mobile tag and a second mobile tag. The first mobile tag is further configured to transmit the acquired positioning information to another device of the UWB system, such as a stationary anchor or a third mobile tag.

14 Claims, 8 Drawing Sheets

(51) Int. Cl.
*G01S 5/02* (2010.01)
*G01S 5/06* (2006.01)

(58) Field of Classification Search
USPC .............. 340/572.1; 342/42, 465; 455/456.1, 455/456.3
See application file for complete search history.

(56) References Cited

U.S. PATENT DOCUMENTS

| 2002/0070862 | A1* | 6/2002 | Francis | ................ | G06Q 10/087 340/572.1 |
| 2003/0174086 | A1* | 9/2003 | Hirt | ........................... | G01S 5/02 342/42 |
| 2005/0136942 | A1* | 6/2005 | Timiri | ..................... | H04W 4/02 455/456.1 |
| 2006/0267841 | A1 | 11/2006 | Lee et al. | | |
| 2008/0204322 | A1* | 8/2008 | Oswald | ..................... | G01S 5/04 342/465 |
| 2018/0067191 | A1* | 3/2018 | Hamilton | .............. | G01S 5/0242 |
| 2020/0217918 | A1* | 7/2020 | Ryden | ................... | G01S 5/0215 |
| 2020/0319289 | A1* | 10/2020 | Borsos | ....................... | G01S 5/06 |

OTHER PUBLICATIONS

"High precision UWB-IR indoor positioning system for IoT applications", Rejina Wei Choi Ling • Ankur Gupta • Ankush Vashistha • Manmohan Sharma • Choi Look Law, Published in: 2018 IEEE 4th World Forum on Internet of Things (WF-IoT) (pp. 135-139), Feb. 2018 (Year: 2018).*

Mensing, C. et al., "Centralized Cooperative Positioning and Tracking with Realistic Communications Constraints", 2010 7th Workshop on Positioning, Navigation and Communication, Mar. 11, 2010, pp. 215-223, IEEE.

* cited by examiner

TECHNIQUE FOR ULTRA-WIDE BAND POSITIONING

TECHNICAL FIELD

The present disclosure generally relates to ultra-wide band (UWB) positioning. Specifically, the disclosure relates to an UWB positioning system comprising mobile tags and stationary anchors.

BACKGROUND

Positioning techniques are gaining increasing importance in areas of industry and society in which distances, locations or orientations have to be determined. Positioning can be used for a variety of use cases such as automation in industry (e.g., tracking of products or machinery, robot control), health care (e.g., tracking of patients or equipment in a hospital), safety (e.g., autonomous driving, tracking workers in a mine), and so on. Determining an accurate location is especially challenging indoors where GPS signals are very weak or easily lost due to the fading effect of walls and ceilings.

UWB positioning techniques have been proved to be very efficient for positioning between peers since their high time resolution enables for accurate measurements. A typical UWB positioning system is illustrated in FIG. 1. The UWB positioning system comprises multiple devices such as fixed stations with known positions (anchors A), mobile agents with unknown positions (tags T) and a central positioning entity (e.g., implemented as a cloud C) to control the measurements and receive the measurement results, run positioning algorithms and provide an interface towards high level use cases.

An exemplary UWB positioning procedure comprises the exchange of at least one UWB signal between a tag T and an anchor A and the measurement of an associated physical parameter such as angle of signal arrival (AOA) or time of signal arrival (TOA). The anchors A report their measurement results to the central positioning entity C which estimates tag locations based on the reported measurement results and a priori knowledge of the anchor locations. When, as illustrated in FIG. 1, measurement results for a certain tag $T_1$ are available from multiple anchors $A_1$ to $A_4$, the location of the tag $T_1$ can be estimated by triangulation or similar approaches.

It has been found that UWB positioning often faces the challenges of obscuring and fading. When, for example, two communicating devices T and A are separated by objects (walls, windows, metallic surfaces or even human bodies), UWB signals are weakened or even get completely lost. Multipath effects can also take place. When, for example, non-line-of-sight signals are detected due to reflections and scattering, the measured path length is higher than the actual distance, thus providing over-estimated ranging results.

In a well-designed two-dimensional UWB positioning system (i.e., assuming that tags T and anchors A are on one plane), at least three anchors A have to see each tag T at a time to determine the tag location by triangulation. This is illustrated for tag $T_1$ and anchors $A_1$ to $A_4$ in FIG. 1 (dashed lines represent the line-of-sight visibility of the tags T from the anchors A). In a three-dimensional UWB positioning system (i.e., a tag location is determined by three spatial coordinates), positioning information from four or more anchors A is needed to properly localize a tag T.

Industrial assembly halls, warehouses, shopping malls, airports, etc. are, however, places full of metallic surfaces blocking the radio signals and thus resulting in lower precision or even causing coverage holes for the UWB positioning system. Therefore, given a fixed UWB positioning infrastructure as shown in FIG. 1, an individual tag T might not be visible by a sufficient number of anchors A. In the scenario of FIG. 1, the location of tag $T_2$ cannot, or not precisely, be determined because it is visible by only two anchors $A_1$ and $A_2$ (e.g., due to fading effects or distance).

Another problem is that the required positioning precision can be different for different use cases. Safety-critical use cases (e.g., real-time tracking of autonomous vehicles to avoid collisions) require at least three or even more anchors with a line-of-sight visibility from the tag to achieve a sufficiently high precision. Dynamically adapting the precision to the use case is, however, not possible with the current anchor setups.

A dense anchor deployment could mitigate the above and other problems. However, such an approach is not just expensive, but additionally implies using more radio resource. The use of more radio resources, however, leads to higher radio interference and, thus, lower system performance. Moreover, present anchor deployment approaches cannot handle a dynamically changing environment (e.g., to cope with moving blocking objects, building restructuring, etc.).

SUMMARY

Accordingly, there is a need for a UWB positioning technique that provides a greater flexibility to avoid one or more of the disadvantages described above, or other disadvantages.

According to a first aspect, a mobile tag for a UWB positioning system is provided. The mobile tag of the first aspect is a first mobile tag configured to acquire positioning information that depends on a relative position between the first mobile tag and a second mobile tag, and to transmit the acquired transmission information to one or more devices of the UWB positioning system.

The acquired positioning information may enable a determination of an absolute or relative location of the second mobile tag (e.g., in a two-dimensional or three-dimensional coordinate system) or for determining a relative distance or a relative orientation of the second mobile tag with respect to a reference point. The reference point may be another device of the UWB positioning system, such as the first mobile tag. The actual determination of the location, distance or orientation may be performed by a device different from the first mobile tag and based on additional information.

The first mobile tag may be configured to receive one or more UWB signals from the second mobile tag. Alternatively, or in addition, the first mobile tag may be configured to transmit one or more UWB signals to the second mobile tag.

In one variant the first mobile tag is configured to receive a first signal from or transmit a first signal to the second mobile tag and to acquire the positioning information based on at least one first parameter associated with the first signal. The at least one first parameter may comprise one or more of a time instant of receipt of the first signal at the first mobile tag, a time instant of transmission of the first signal by the second mobile tag, an angle of incidence of the first signal at the first mobile tag, a signal strength of the first signal, and so on. Consequently, the acquired positioning information may comprise one or more of AOA, TOA and time difference of signal arrival (TDOA), or may be derived using an AOA-, TOA- and/or TDOA-based approach. A TOA- or TDOA-based approach may optionally be combined with Time-of-Flight (ToF) calculations to acquire the positioning information in the form of a distance between the first mobile tag and the second mobile tag.

In case one or more further signals are exchanged between first mobile tag and the second mobile tag in the context of acquiring the positioning information, the positioning information may be acquired by the first mobile tag additionally based on at least one further parameter (e.g., similar to the first parameter) associated with the at least one further signal.

The acquired positioning information may comprise or may be identical to the at least one first (and any further) parameter. In another variant, the acquired positioning information may be determined by the first mobile tag on the basis of the at least one first (and any further) parameter.

In one implementation, the first mobile tag is configured to transmit a second signal to the second mobile tag, wherein the second signal is transmitted responsive to receipt of the first signal or to trigger transmission of the first signal. In such a case the first mobile tag may acquire the positioning information based on at least one second parameter associated with the second signal. Exemplary parameters in this regard have already been listed above in regard to the first signal. For example, the at least one second parameter may comprise at least one of a time instant of transmission of the second signal by the first mobile tag and a time instant of receipt of the second signal at the second mobile tag.

The first mobile tag may further be configured to receive, following receipt of the first signal and/or transmission of the second signal, a third signal from the second mobile tag. In one example, the third signal reports at least one of the time instant of transmission of the first signal by the second mobile tag, the time instant of receipt of the second signal at the second mobile tag, and the time instant of transmission of the third signal by the second mobile tag. In such a case, the first mobile tag may acquire the positioning information based on at least one of the time instant of transmission of the third signal by the second mobile tag and a time instant of receipt of the third signal at the first mobile tag. For example, the positioning information may comprise, may be identical to or may be derived from the time instants of transmission and receipt of each of the first signal, the second signal and the third signal.

The first mobile tag may further be configured to detect an event that causes the first mobile tag to assume or to leave an anchor role. The event may be one of expiry of a timer (e.g., a local timer of the first mobile tag), receipt of a command (e.g., from a stationary anchor) and based on a time schedule.

In the anchor role, the first mobile tag may be configured to perform one or more steps typically performed by a stationary anchor of the UWB positioning system. In one realization, the first mobile tag is configured to perform one or both of the acquiring step and the transmitting step only when the first mobile tag is assuming the anchor role.

When assuming the anchor role, the first mobile tag may, from the perspective of the second mobile tag, have a similar functionality as a stationary anchor. For example, in the anchor role the first mobile tag may be configured to perform with the second mobile tag one or more steps of a positioning procedure which the second mobile tag will typically perform with a stationary anchor. The positioning procedure may comprise the exchange of one or more UWB signals between the first mobile tag and the second mobile tag as explained above.

The first mobile tag may be configured to assume the anchor role only for a limited period of time. As an example, the first mobile tag may be configured to assume the anchor role only during a time period of a few seconds or few tens of seconds.

Limitation of the period of time in which the first mobile tag assumes the anchor role can be important to ensure that the first mobile tag is not, or not significantly, moving while assuming the anchor role. When moving while assuming the anchor role, the positioning information acquired by the first mobile tag may not be reliable.

The first mobile tag may further be configured to transmit the positioning information in a positioning request for a positioning procedure between the first mobile tag and a receiver of positioning request (the positioning request may be the initial signal of that positioning procedure). As an example, the positioning request may be transmitted after the first mobile tag has left the anchor role. In particular, the positioning request may be transmitted by the first mobile tag in a regular tag role. The positioning request may be the first signal in a positioning procedure between the first mobile tag and the receiver of the positioning request. In one variant, the positioning request is transmitted by the first mobile tag to at least one stationary anchor as the positioning request receiver. In another variant, the positioning request is transmitted to at least one third mobile tag assuming an anchor role. The third mobile tag may be identical to or different from the second mobile tag.

The first mobile tag may further be configured to receive positioning information from a fourth mobile tag, wherein the received positioning information depends on a relative position between the fourth mobile tag and the fifth mobile tag (the fourth and fifth mobile tags may be different from the first to third mobile tags). The positioning information received from the fourth mobile tag, or positioning information derived therefrom, may be transmitted to one or more devices of the UWB positioning system (e.g., to a still further mobile tag or to a stationary anchor). In one variant, the receiving and transmitting steps are only performed when the first mobile tag does not assume an anchor role (but, for example, a tag role).

The positioning information from the fourth mobile tag may be received by the first mobile tag together with control information. In such a case the first mobile tag may be configured to evaluate the received control information and conditionally transmit the positioning information, or positioning information derived therefrom, to one or more devices of the UWB positioning system dependent on a result of the evaluation of the control information. The control information may be configured to avoid at least one of circulating and flooding of the positioning information from the fourth mobile tag in the UWB positioning system. The control information may, for example, take the form of a decrementable time-live-counter or a dynamically managed list of identifiers of mobile tags that have already previously received the corresponding positioning information.

The positioning information received from the fourth mobile tag, or positioning information derived therefrom, is in one variant transmitted to at least one stationary anchor. In another variant, the positioning information received from the fourth mobile tag, or positioning information derived therefrom, is transmitted to at least one sixth mobile tag assuming an anchor role.

According to a second aspect, a device for an UWB positioning system is presented. The device is configured to receive, from a first mobile tag, positioning information that depends on a relative position between a second mobile tag and a third mobile tag, and to transmit the received positioning information, or information derived therefrom, to one or more other devices of the UWB positioning system.

The first mobile tag may be identical to the second mobile tag. In another variant, the first mobile tag is different from the second mobile tag.

The device according to the second aspect may further be configured to transmit, to the first mobile tag, a command instructing same to one of assume and leave an anchor role. The command may be transmitted responsive to detection of an event by the device. The event may be expiry of a timer, receipt of a command for another device of the UWB positioning system, or based on a time schedule.

In one implementation, the device is a stationary anchor configured to transmit the received positioning information, or the positioning information derived therefrom, to a central positioning entity of the UWB positioning system. In another implementation, the device is a fourth mobile tag capable of assuming an anchor role and of transmitting the received positioning information, or the positioning information derived therefrom, to a stationary anchor of the UWB positioning system.

According to a third aspect, a device for a UWB positioning system is presented. The device is configured to receive first positioning information that depends on a relative position between a first mobile tag and a second mobile tag, to receive second positioning information that depends on a relative position between the second mobile tag and further device of the UWB positioning system, and to determine a location of the first mobile tag based on at least one of the first and second positioning information.

As explained above, the second positioning information depends on a relative position between the second mobile tag and a further device of the UWB positioning system. That further device may be a stationary anchor. Alternatively, that further device may be a fourth mobile tag (that may be different from the first, second and third mobile tags). In the latter case, the location of the first mobile tag may further be determined based on a relative position between the third mobile tag and a stationary anchor.

The device according to the third aspect may further be configured to validate the first positioning information taking into account a movement history of the second mobile tag. For example, the device may discard the first positioning information and, optionally, request new first and second positioning information in case it is found that the second mobile tag was significantly moving during a period of time when the first positioning information was acquired.

The device according to the third aspect may be a central positioning entity of the UWB positioning system. The central positioning entity may be configured to receive positioning information from a plurality of stationary anchors and to determine the location of individual mobile tags.

A further aspect is directed to a UWB positioning system comprising the first mobile tag according to the first aspect and the second mobile tag. The UWB positioning system may comprise one or more further mobile tags as described herein. Optionally, the UWB positioning system further comprises one or more devices according the second aspect and configured as stationary anchors. Still further, the UWB positioning system may comprise a device according to the third aspect and configured as a central positioning entity.

Also provided is a method of operating a mobile tag for an UWB positioning system. The method is performed by the mobile tag as a first mobile tag and comprises acquiring positioning information that depends on a relative position between the first mobile tag and a second mobile tag, and transmitting the acquired positioning information to one or more devices of the UWB positioning system.

According to a further aspect, a method of operating a device for an UWB positioning system is presented. The method is performed by the device and comprises receiving, from a first mobile tag, positioning information that depends on a relative position between a second mobile tag and a third mobile tag, and transmitting the received positioning information, or positioning information derived therefrom, to one or more other devices of the UWB positioning system.

According to a still further aspect, a method of operating a device for an UWB positioning system is presented. The method is performed by the device and comprises receiving first positioning information that depends on a relative position between a first mobile tag and a second mobile tag, receiving second positioning information that depends on a relative position between the second mobile tag and a further device of the UWB positioning system, and determining a location of the first mobile tag based at least on the first and second positioning information.

The operating methods described above may comprise further steps and procedures as described above and below.

Also presented is a computer program product comprising program code portions that perform any of the method aspects disclosed herein when the computer program product is executed on one more processing devices. The computer program product may be stored on a computer-readable storage medium, such as a semiconductor memory, CD-ROM or DVD. The computer program product may also be provided for download via a network.

BRIEF DESCRIPTION OF THE DRAWINGS

Further aspects, details and advantages of the present disclosure will become apparent from the detailed description below and the drawings, wherein.

DETAILED DESCRIPTION

In the embodiments described below, one or more mobile tags (also called "morphing tags" hereinafter) are capable of changing their role occasionally to act as anchors for other mobile tags. As illustrated in FIG. 2, a morphing tag is capable of dynamically transmorphing between an anchor role 210 and a ("regular") tag role 220. In the anchor role 210, the morphing tag is enabled to participate in a positioning procedure as anchor for another mobile tag located in the vicinity of the morphing tag and assuming a regular tag role. The positioning procedure will thus be performed between a previously "unseen" (or not "fully" seen) mobile tag, for example tag $T_2$ in FIG. 1, and at least one morphing tag such that the positioning precision can be improved, as will now be explained with reference to FIG. 3.

Figure 1:
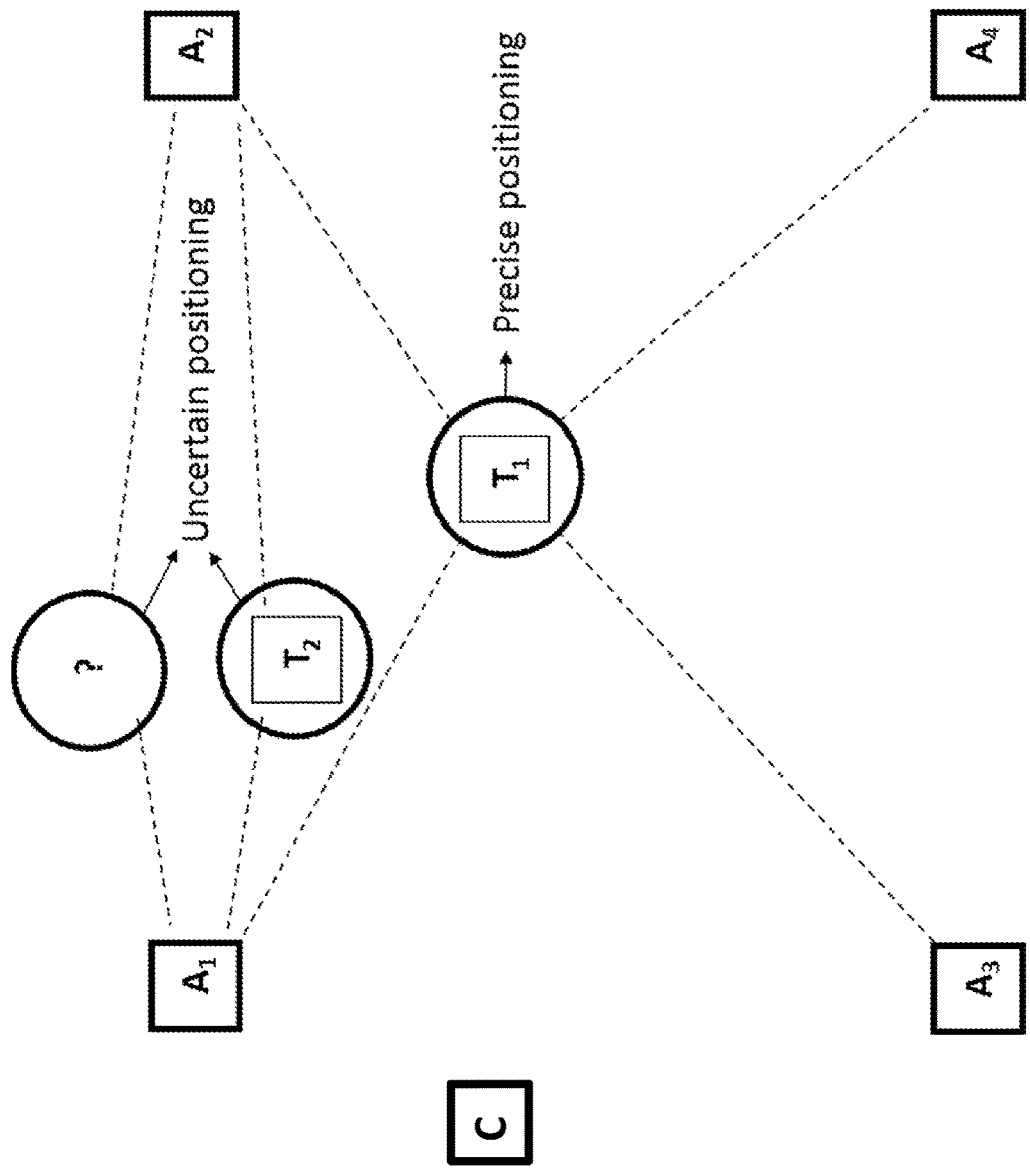
FIG. 1 illustrates two different positioning scenarios in a UWB positioning system.
Figure 2:
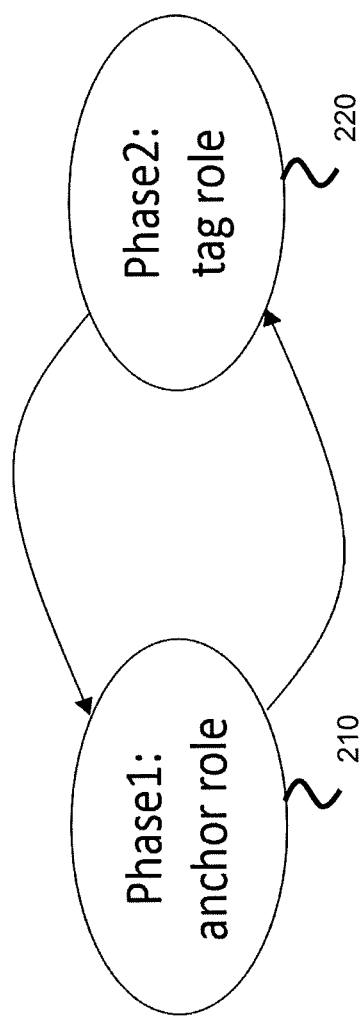
FIG. 2 illustrates transitions between an anchor role and a tag role by a morphing tag in accordance with an embodiment of the present disclosure.
Figure 3:
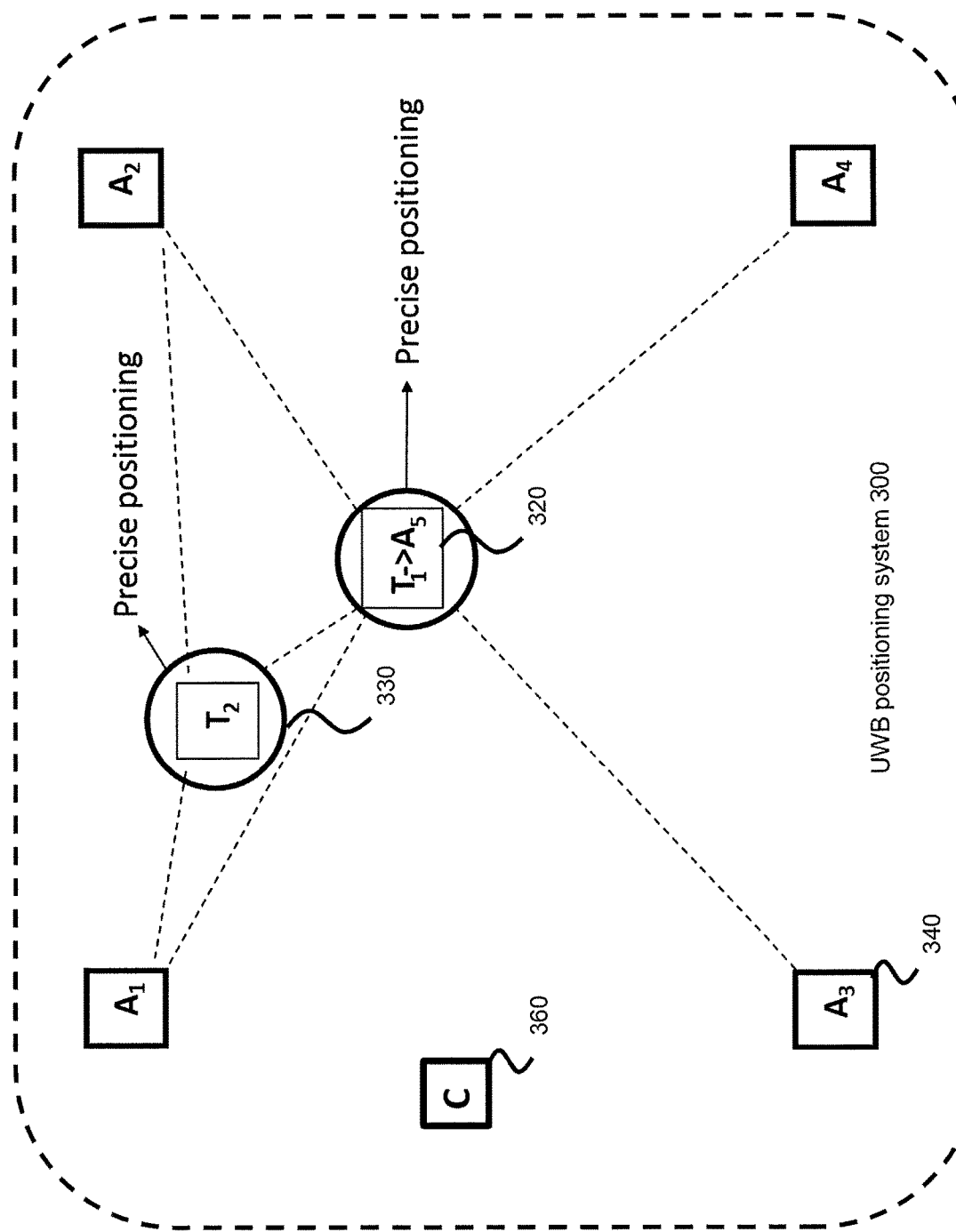
FIG. 3 illustrates an embodiment of a UWB positioning system with a morphing tag.

FIG. 3, which is based on FIG. 1, illustrates an embodiment of a UWB positioning system 300 comprising at least one morphing tag 320 (identified as $T_1$->$A_5$ in FIG. 3) and at least one unseen/not fully seen tag 330 (identified as $T_2$ in FIG. 3). It should be noted that one or more or all of the tags in the UWB positioning system 300 may be configured as morphing tags.

The UWB positioning system 300 further comprises a plurality of stationary anchors 340 (identified as $A_1$ to $A_4$ in FIG. 3) as well as a central positioning entity 360 (identified as C in FIG. 3). The anchors 340 are configured to wirelessly communicate with the tags 320, 330 via UWB signals. The central positioning entity 360 and the stationary anchors 340 are configured to communicate with each other via wireless (not necessarily UWB) or wired connections.

The UWB positioning system 300 may operate in the frequency regime between ca. 2 and ca. 12 GHz (e.g., between 3.1 and 12.6 MHz) and at a UWB signal bandwidth of at least ca. 250 MHz (e.g., at least 500 MHz).

Positioning information acquired by the morphing tag 320 for the unseen/not fully seen tag 330 may be stored by the morphing tag 320 while assuming the anchor role and may be sent to one or more of the stationary anchors 340, for example to the anchor $A_3$ in FIG. 3, later on in a phase in which the morphing tag 320 is in the tag role again. The stationary anchor 340 then forwards the positioning information received from the morphing tag 330, or positioning information derived therefrom, to the central positioning entity 360.

A physical layer and a media access control layer of the UWB positioning system 300 may be configured as defined, for example, in the IEE 802.15.4a standard. Signaling to implement the morphing tag concept presented herein can take place on an application layer.

Figure 4:
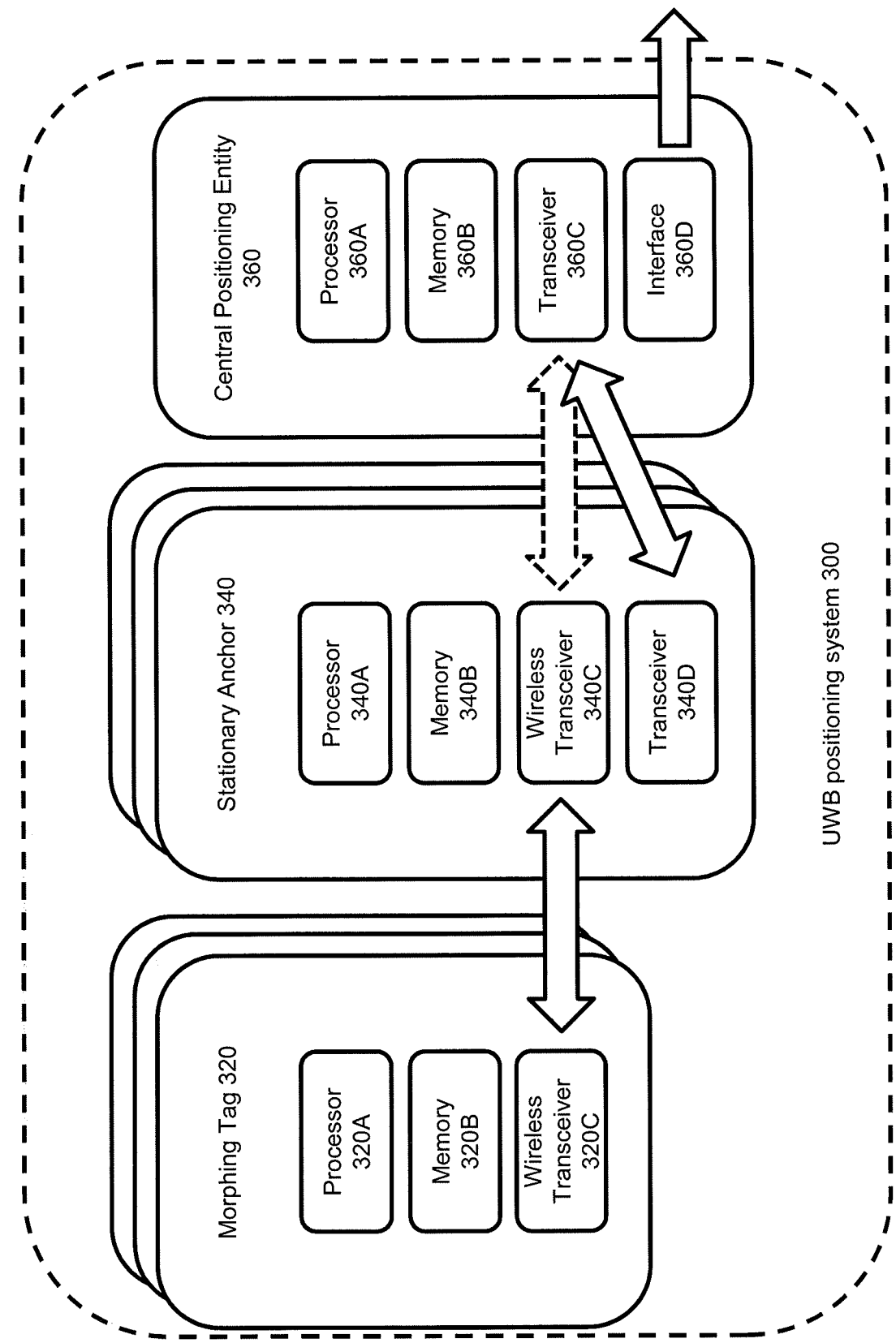
FIG. 4 illustrates embodiments of a morphing tag, a stationary anchor and a central positioning entity, respectively.

FIG. 4 illustrates in greater detail an exemplary configuration of each of the morphing tag 320, the stationary anchor 340 and the central positioning entity 360 as well as the communication capabilities of these devices. As will be appreciated, the UWB positioning system 300 may comprise multiple morphing tags 340 and multiple stationary anchors 340, but will typically comprise only a single central positioning entity 360.

As shown in FIG. 4, the morphing tag 320 comprises at least one processor 320A, at least one memory 320B and at least one wireless UWB transceiver 320. The at least one memory 320B is accessible by the at least one processor 320A and stores program code to be executed by the at least one processor 320A to control the operation of the morphing tag 320. Moreover, the at least one memory 320B may further store positioning information acquired by the morphing tag 320 for another mobile tag 330. The stored positioning information may be sent via the wireless transceiver 320C to one or more stationary anchors 340.

Similarly, the stationary anchor 340 comprises at least one processor 340A, at least one memory 340B, at least one wireless UWB transceiver 340D and an optional further transceiver 340D. The further transceiver 340D may be a wirebound transceiver or a transceiver configured to operate in accordance with a short-range communication technology such as Bluetooth or a Wireless Local Area Network (WLAN) standard.

The at least one memory 340B is accessible by the at least one processor 340A and stores program code to be executed by the at least one processor 340A to control the operation of the stationary anchor 340. Moreover, the at least one memory 340B may further store the positioning information acquired for the mobile tag 330 by the morphing tag 320 (and, optionally, by one or more further morphing tags not illustrated in FIG. 3) and received by the stationary anchor 340 via the wireless transceiver 340C.

The stationary anchor 340 is configured to forward the stored positioning information via the transceiver 340D (or, if the latter is not present or used otherwise, via the wireless transceiver 340C) to the central positioning entity 360.

As shown in FIG. 4, the central positioning entity 360 comprises at least one processor 360A, at least one memory 360B, at least one transceiver 360C and an interface 360D. In some variants, the central positioning entity 360 may be implemented using distributed hardware resources (e.g., in the form of a computing cloud).

The transceiver 360C may be a wirebound transceiver, an UWB transceiver or a transceiver configured to operate in accordance with a short-range communication technology such as Bluetooth or a Wireless Local Area Network (WLAN) standard. The at least one memory 360B is accessible by the at least one processor 360A and stores program code to be executed by the at least one processor 360A to control operation of the central positioning entity 360. Moreover, the at least one memory 360B may further store the positioning information acquired by the morphing tag 320 for the mobile tag 330 and received by the central positioning entity 360 from the stationary anchor 340 (and, optionally, positioning information for the mobile tag 330 received from one or more further stationary anchors 340) via the at least one transceiver 360C.

The at least one processor 360A is configured to process the positioning information acquired for the mobile tag 330 by the morphing tag 320 (and, optionally, by one or more further morphing tags) to determine positioning-related data in regard to the mobile tag 330, such as its absolute or relative location (e.g., from its distance or angular orientation to one or more reference points). The corresponding data may be output via the interface 360 to another device or application depending on the specific use case (e.g., to a robot controller, a display device, an autonomous driving controller, and so on).

Figure 5:
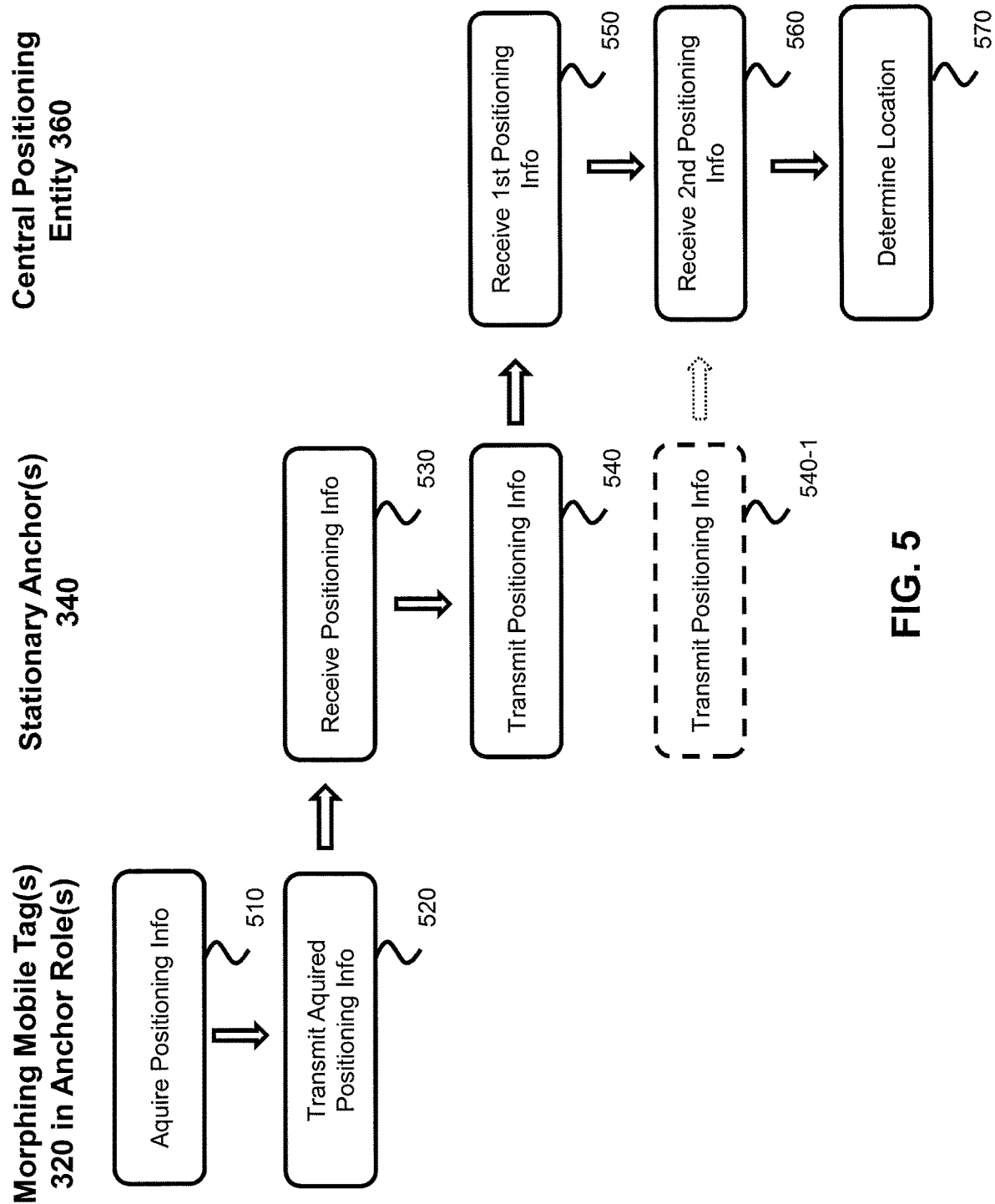
FIG. 5 illustrates method embodiments performed by a morphing tag, a stationary anchor and a central positioning entity, respectively.

FIG. 5 illustrates in three flow diagrams methods of operating the morphing tag 320, the stationary anchor 340 and the central positioning entity 360, configured as exemplarily depicted in FIG. 4 or otherwise, respectively.

The operation of the morphing tag 320, in its role as an anchor, includes acquiring positioning information for the mobile tag 330 assuming a regular tag role (see step 510). The positioning information may be acquired on the basis of at least one UWB signal exchanged between the morphing tag 320 and the mobile tag 330. As an example, the acquired positioning information may be indicative of a distance and/or an angle between the morphing tag 320 and the mobile tag 330. Additionally, or in the alternative, also other parameters associated with the one more exchanged UWB signals may form the basis for acquiring the positioning information (e.g., a signal strength)

In exemplary regard to distance, the positioning information may be acquired in the form of (or may be derived from) time instants of transmission and receipt of the one or more UWB signals exchanged between the morphing tag 320 and the mobile tag 330. Based on time differences associated with these time instants and the speed of light, the distance between the morphing tag 320 and the mobile tag 330 may be calculated. This calculation may be performed by the morphing tag 320 or the stationary anchor 340, or by the central positioning entity 360.

In a further step 520, the positioning information acquired by the morphing tag 320 is transmitted to the stationary anchor 340. As an example, the morphing tag may transmit the time instants of receipt and transmission of one or more UWB signals exchanged between the morphing tag 320 and the mobile tag 330 (or the associated time differences) to the stationary anchor 340. Alternatively, or in addition, the morphing tag may calculate the distance between the morphing tag 320 and the mobile tag 330 based on the associated time differences and the speed of light and may transmit that distance as positioning information to the stationary anchor 340. Of course, in other variants angular information or other positioning information that depends on the relative position between the morphing tag 320 and the mobile tag 330 may be acquired in step 510 and transmitted in step 520 to the stationary anchor 340.

The transmission step 520 may be performed immediately after the acquiring step 510. Alternatively, the transmission step 520 may be performed responsive to leaving the anchor role by the morphing tag 320. In one variant, the transmission step 520 may be performed by the morphing tag 320 in its regular tag role and upon the next communication occasion with any stationary anchor 340, for example when issuing a regular positioning request (for determining the position of the morphing tag 320) to the stationary anchor 340. In this case, the positioning request to the stationary anchor 340 may carry the acquired positioning information for the mobile tag 330.

The operation of the stationary anchor 340 comprises receiving, in step 530, the positioning information acquired and transmitted by the morphing tag 320. The received positioning information may optionally be pre-processed by the stationary anchor 340 (e.g., to determine the distance between the morphing tag 320 and the mobile tag 330 in case only the time instants or time differences for the signal exchanges are comprised in the received positioning information). The processed or non-processed positioning information as received from the morphing tag 320 is then transmitted in step 540 to the central positioning entity 360.

The stationary anchor 340 may also itself acquire positioning information for the morphing tag 320 when same assumes a regular tag role. The acquisition of such positioning information by the stationary anchor 340 for the morphing tag 320 may be performed as explained above (and below) in connection with morphing tag 320 and the mobile tag when the first assumes an anchor role. The positioning information acquired by the stationary anchor 340 (or any other stationary anchor of the UWB positioning system 300) for the morphing tag 320 is transmitted to the central positioning entity 360 in step 540-1. In certain scenarios with multiple morphing tags 320, the stationary anchor 340 may receive positioning information for the mobile tag 330 from two or more such morphing tags 320. As such, the stationary anchor 340 may transmit positioning information received for the mobile tag 330 from another morphing tag 320 (and optionally pre-processed by the stationary anchor 340) to the central positioning entity 360, see also step 540-1. Steps 540 and 540-1 may be performed simultaneously (e.g., in a single message) or at different points in time.

The operation of the central positioning entity 360 comprises receiving at least two items of positioning information form either the same stationary anchor 340 or from different stationary anchors 340 (see steps 550 and 560). The first positioning information depends on a relative position between the mobile tag 330 and the morphing tag 320. The second positioning information depends on a relative position between the morphing tag 320 and a further device of the UWB positioning system, such as the stationary anchor 340 (the position of which is a priori known to the central positioning entity 360). The central positioning entity 360 may receive one, two or more further items of positioning information for the mobile tag 330, wherein each further items of positioning information depends on a relative position between the mobile tag 330 and either the morphing tag 320, a different morphing tag 320 or any stationary anchor 340.

The operation of the central positioning entity 360 also comprises determining a location of the mobile tag 330 based on one or more of the received items of positioning information (see step 570). As an example, the central positioning entity 360 may receive sufficient items of positioning information to determine the distance between the mobile tag 330 and three of four other devices of the UWB positioning system 300 having known or computable locations, including the morphing tag 320 and one or more further morphing tags and/or one or more stationary anchors 340. The location of the morphing tag 320 may be determined in a conventional manner (e.g., by triangulation) when it assumes a regular tag role. From the known or computed locations and the associated distances to the mobile tag 330, the location of the mobile tag 330 may then be determined in a conventional manner (e.g., by triangulation).

The locations of the stationary anchors 340 will be known to the central positioning entity 360 a priori. For processing, however, in step 570 the positioning information acquired by the morphing tag 320 in an anchor role, it will be necessary for the central positioning entity 360 to validate the positioning information acquired by the morphing tag 320. In this regard, the central positioning entity 360 has to validate the location of the morphing tag 320 at the time when the morphing tag 320 has acquired the positioning information for the mobile tag 330 to ensure that the morphing tag 320 was not moving.

A said, the location of the morphing tag 320 may be determined in a conventional manner when it assumes a tag role. For validation purposes, the central positioning entity 360 may analyze a movement history of the morphing tag 320 to determine the location of the morphing tag 320 immediately before it has assumed its anchor role and its location immediately after it has left the anchor role. In case both locations match (within a predefined spatial threshold), the morphing tag 320 is validated to have been substantially stationary, and the positioning information acquired by the morphing tag 320 in the anchor role is likewise validated to be usable for determining the location of the mobile tag 330. If, however, the two locations of the morphing tag 320 before it assumed the anchor role and after it left the anchor role deviate significantly, the positioning information acquired by the morphing tag 320 for the mobile tag 330 will be discarded by the central positioning entity 360. In such a case new positioning information may be requested for the mobile tag 330.

The transition from the anchor role to the tag role by the morphing tag 320, and vice versa, may be triggered by events detected by the morphing tag 320 (see also FIG. 2).

Such events include expiry of a timer (e.g., a local timer of the morphing tag 320), receipt of a dedicated command by the morphing tag 320 to assume or leave the anchor role, a predefined time schedule, or a combination thereof. The command(s) may be transmitted to the morphing tag 320 by the stationary anchor 340 (and, optionally, under control of the central positioning entity 360).

In one embodiment, the morphing tag 320 receives a command in its tag role to assume the anchor role. Upon assuming the anchor role, the morphing tag 320 starts a timer and, upon timer expiry, returns to the tag role. The timer may be set to a comparatively short period of time to ensure that the morphing tag 320 remains essentially stationary while assuming the anchor role. The period of time may be in the order or seconds or tens of seconds.

Figure 6:
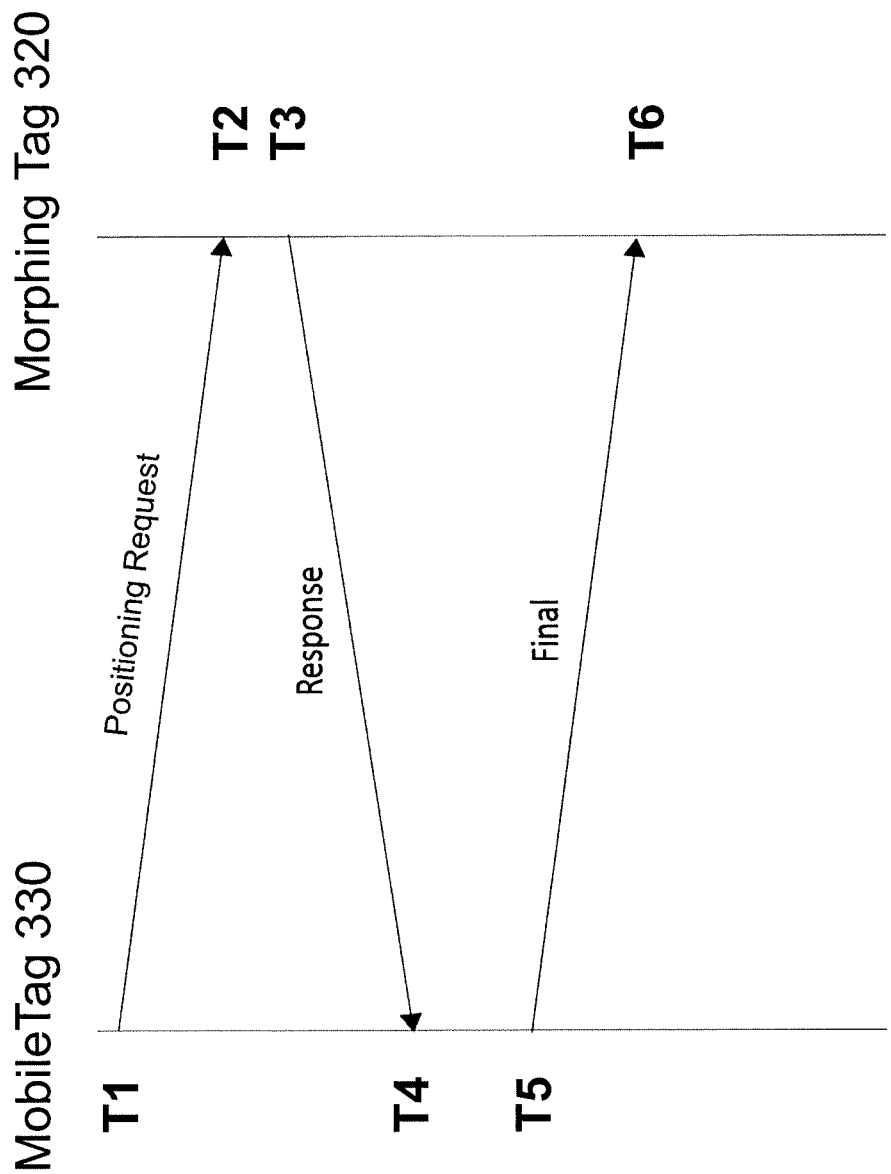
FIG. 6 illustrates an embodiment of a positioning procedure between a mobile tag and a morphing tag.

FIG. 6 illustrates an embodiment of UWB signals exchanged between the mobile tag 330 and the morphing tag 320 in its anchor role in accordance with an exemplary positioning procedure. As illustrated in FIG. 6, the mobile tag 330 initiates the positioning procedure by transmitting, at time instant T1, a first signal (a so-called positioning request) to the morphing tag 320. This first signal is received by the morphing tag 320 at time instant T2. Then, at time instant T3, the morphing tag 320 transmits a response signal to the mobile tag 320, where it is received at time instant T4. The mobile tag 320 responds by transmitting a final signal, at time instant T5, to the morphing tag 320, where it is received at time instant T6.

Time instants T1, T4 and T5 are measured by the mobile tag 330 and time instants T2, T4 and T5 are measured by the morphing tag 320. The time instants T1, T4 and T5 are communicated by the mobile tag 330 to the morphing tag 320. For example, information indicative of the time instants T1, T4 and T5 may be transmitted in the final signal. Alternatively, information indicative of the time instant T1 may be transmitted in the positioning request signal and information indicative of the time instants T4 and T5 may be transmitted in the final signal. As a still further alternative, information indicative of the time instants T1, T4 and T5 may be transmitted from the mobile tag 330 to the morphing tag 320 in a separate signal after the final signal.

The morphing tag 320 may transmit information indicative of the six time instants T1 to T6 as acquired positioning information to the stationary anchor 340 as explained above. Alternatively, the morphing tag 320 may process time-of-flight information derivable from the time instants T1 to T6 so as to determine the distance between the mobile tag 330 and the morphing tag 320. The distance thus determined may then be transmitted as acquired positioning information to the stationary anchor 340.

Generally, the distance between the mobile tag 330 and the morphing tag 320 may be calculated from the time-of-flight of at least one signal exchanged between the mobile tag 330 and the morphing tag 320 and the speed of light. In the specific signalizing scenario of FIG. 6, the time-of-flight (ToF) may be determined as follows:

$$\text{ToF}=((T4-T1)-(T3-T2)+(T6-T3)-(T5-T4))/4$$

Of course, the distance calculation approach explained above with reference to FIG. 6 could easily be extended to scenarios in which only a single signal or only two signals are exchanged between the mobile tag 330 and the morphing tag 320, or to scenarios in which four or more signals are exchanged between the mobile tag 330 and the morphing tag 320.

In some variants, the positioning request signal and the final signal each comprises an identifier of the mobile tag 330. This identifier allows the morphing tag 320 to associate the time instant T2 at which the positioning request signal is received with the time instants T1, T4 and T5 as, for example, indicated in the final signal.

It is important to note that the positioning information eventually acquired by the morphing tag 320 will typically not directly be sent to the central positioning entity 360 as there typically is no direct communication channel between the morphing tag 320 (and any other tag in the UWB positioning system 320) on the one hand and the central positioning entity 360 on the other hand. For this reason, the positioning information acquired by the morphing tag 320 for the mobile tag 330 will first be transmitted from the morphing tag 320 to one of the stationary anchors 340, from where it is transmitted to the central positioning entity 360 (with an optional pre-processing by the stationary anchor 340).

In one variant, the morphing tag 320 when again assuming its tag role is configured to transmit the positioning information acquired for the mobile tag 340 to a stationary anchor 340. This transmission may occur in connection with a regular positioning procedure between the morphing tag 320 and that stationary anchor 340 as exemplarily depicted in FIG. 7. It will be assumed that the positioning procedure between the morphing tag 320 in a tag role and the stationary anchor 340 is essentially the same as the positioning procedure between the mobile tag 330 and the morphing tag 320 described above with reference to FIG. 6. One exception, however, is the fact that the positioning request signal transmitted from the morphing tag 320 to the stationary anchor 340 includes the positioning information previously acquired by the morphing tag 320 for the mobile tag 330. The stationary anchor 340 may then transmit the positioning information acquired by the morphing tag 320 for the mobile tag 330 and the positioning information acquired by the stationary anchor 340 for the morphing tag 320 in a single message or in dedicated messages to the central positioning entity 360 (see steps 540 and 540-1 in FIG. 5).

Figure 7:
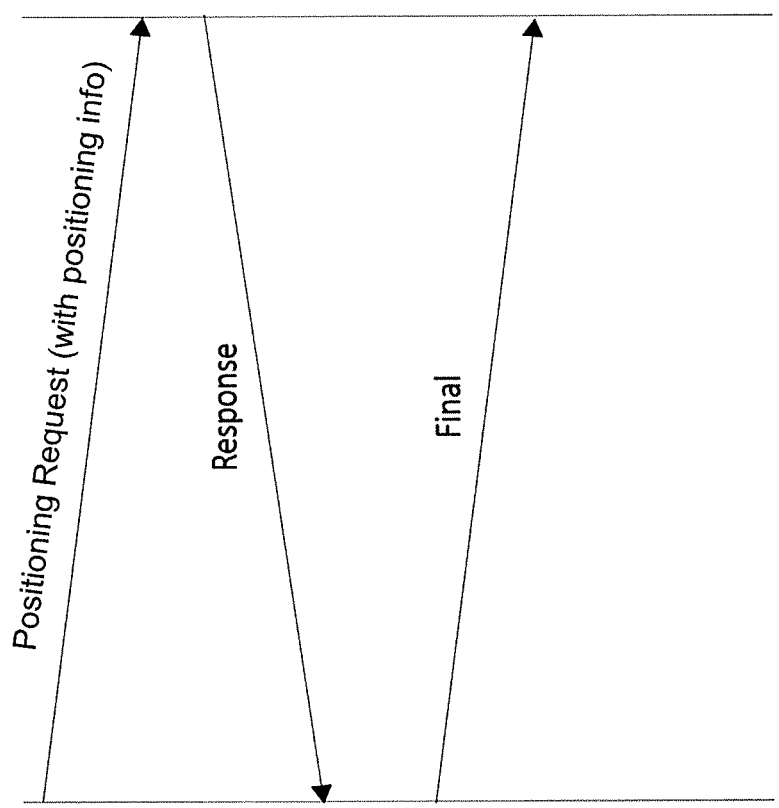
FIG. 7 illustrates an embodiment of a positioning procedure between a morphing tag and a stationary anchor.
Figure 8:
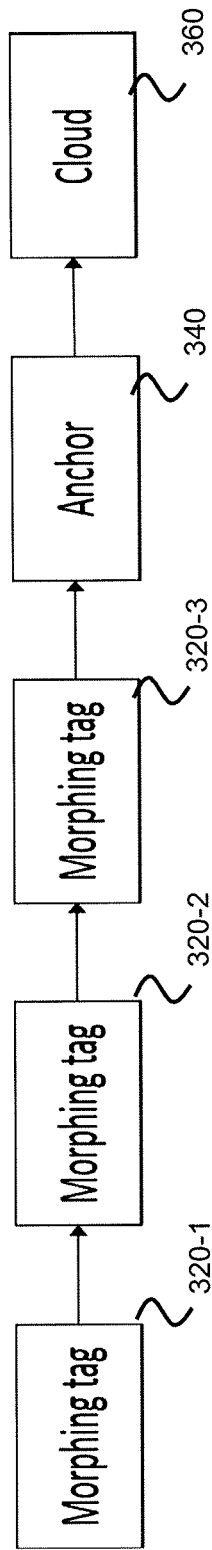
FIG. 8 illustrates propagation of positioning information among multiple morphing tags.

In an alternative implementation illustrated in FIG. 8, a morphing tag 320-1, in a tag role, may transmit the positioning information previously acquired by the morphing tag 320-1 in an anchor role for the mobile tag 330 not directly to a stationary anchor 340, but to another morphing tag 320-2 presently assuming an anchor role. In this manner, the positioning information acquired by one morphing tag 320-1 for a particular mobile tag 330 may propagate within the UWB positioning system 300 via one or more further morphing tags 320-2, 320-3 to a stationary anchor 340, from where it is transmitted to the central positioning entity 360. The positioning information for mobile tag 330 received by morphing tag 320-2 (assuming an anchor role) from another morphing tag 320-1 (assuming a tag role) may be communicated further as generally illustrated in FIG. 7. As such, it may, for example, be communicated in a positioning request when the receiving morphing tag 320-2 again assumes its tag role and initiates a positioning procedure with another morphing tag 320-3 assuming an anchor role or a stationary anchor 340.

In order to avoid a circulation of the positioning information between morphing tags 320-1 to 320-3, the acquired positioning information may be transmitted together with control information (e.g., in the positioning request). The control information may then be evaluated by a recipient of the control information to determine whether or not to further transmit the positioning information to another device of the UWB positioning system 300.

The control information may take the form of a time-to-life counter that is decreased upon each further transmission of the positioning information. The positioning information is then dropped when the counter has reached 0. Alternatively, the control information may take the form of a list of tag identifiers of morphing tags 320 that have already forwarded the positioning information, so that the positioning information will not be forwarded to a morphing tag 320 that is already in the list.

Tag-anchor morphing as explained above permits to set up anchors dynamically (e.g., under the control of the central positioning entity 360). In this manner, the precision of the UWB positioning system 300 can be improved in an inexpensive and flexible manner. In particular, the precision of the UWB positioning system 300 can dynamically be set responsive to changing environments and/or varying use cases without increasing the total number of system components (and the associated signal interference). When a higher precision is needed or a degradation of the precision is to be avoided, one or more morphing tags 320 are simply instructed to assume an anchor role.

The invention claimed is:

1. A mobile tag for an ultra-wide band (UWB) positioning system, wherein the mobile tag is a first mobile tag, the mobile tag comprising:
   processing circuitry;
   memory containing instructions executable by the processing circuitry whereby the mobile tag is operative to:
      acquire positioning information that depends on a relative position between the first mobile tag and a second mobile tag; and
      transmit the acquired positioning information to one or more devices of the UWB positioning system;
      detect an event that causes the first mobile tag to assume or to leave an anchor role;
      wherein the acquiring and/or the transmitting are only performed when the first mobile tag is assuming the anchor role.

2. The mobile tag of claim 1, wherein the instructions are such that the mobile tag is operative to
   receive a first signal from, or transmit a first signal to, the second mobile tag; and
   acquire the positioning information based on at least one first parameter associated with the first signal.

3. The mobile tag of claim 2, wherein the at least one first parameter comprises:
   a time instant of receipt or of the first signal at the first or second mobile tag;
   a time instant of transmission of the first signal by the second mobile tag or the first mobile tag;
   an angle of incidence of the first signal at the first mobile tag or the second mobile tag; and/or
   a signal strength of the first signal.

4. The mobile tag of claim 2, wherein the instructions are such that the mobile tag is operative to:
   transmit a second signal to the second mobile tag, wherein the second signal is transmitted responsive to receipt of the first signal or to trigger transmission of the first signal; and
   acquire the positioning information based on at least one second parameter associated with the second signal.

5. The mobile tag of claim 4, wherein the at least one second parameter comprises a time instant of transmission of the second signal by the first mobile tag and/or a time instant of receipt of the second signal at the second mobile tag.

6. The mobile tag of claim 4, wherein the instructions are such that the mobile tag is operative to:
   receive, following receipt of the first signal and/or transmission of the second signal, a third signal from the second mobile tag reporting the time instant of transmission of the first signal by the second mobile tag, the time instant of receipt of the second signal at the second mobile tag, and/or a time instant of transmission of the third signal by the second mobile tag.

7. The mobile tag of claim 6, wherein the instructions are such that the mobile tag is operative to acquire the positioning information based on the time instant of transmission of the third signal by the second mobile tag and/or a time instant of receipt of the third signal at the first mobile tag.

8. The mobile tag of claim 1, wherein the instructions are such that the mobile tag is operative to transmit the positioning information in a positioning request for a positioning procedure between the first mobile tag and a stationary anchor.

9. The mobile tag of claim 1, wherein the instructions are such that the mobile tag is operative to:
   receive positioning information from a third mobile tag, wherein the received positioning information depends on a relative position between the third mobile tag and a fourth mobile tag; and
   transmit the positioning information received from the third mobile tag, or positioning information derived therefrom, to one or more devices of the UWB positioning system.

10. The mobile tag of claim 9, wherein the instructions are such that the mobile tag is operative to:
    receive the positioning information from the third mobile tag together with control information;
    evaluate the received control information; and
    conditionally transmit the positioning information from the third mobile tag, or positioning information derived therefrom, to one or more devices of the UWB positioning system dependent on a result of the evaluation of the control information.

11. A device for an ultra-wide band (UWB) positioning system, the device comprising:
    processing circuitry;
    memory containing instructions executable by the processing circuitry whereby the device is operative to:
       receive first positioning information that depends on a relative position between a first mobile tag and a second mobile tag;
       receive second positioning information that depends on a relative position between the second mobile tag and a further device of the UWB positioning system; wherein the further device of the UWB positioning system is a third mobile tag; and
       determine the location of the first mobile tag based at least on the first and second positioning information, and based on a relative position between the third mobile tag and a stationary anchor.

12. The device of claim 11, wherein the further device of the UWB positioning system is a stationary anchor.

13. The device of claim 11, wherein the instructions are such that the device is operative to validate the first positioning information taking into account a movement history of the second mobile tag.

14. The device of claim 11, wherein the device is a central positioning entity of the UWB positioning system.

* * * * *